J. W. HESS.
Car-Couplings.
No. 145,652. Patented Dec. 16, 1873.
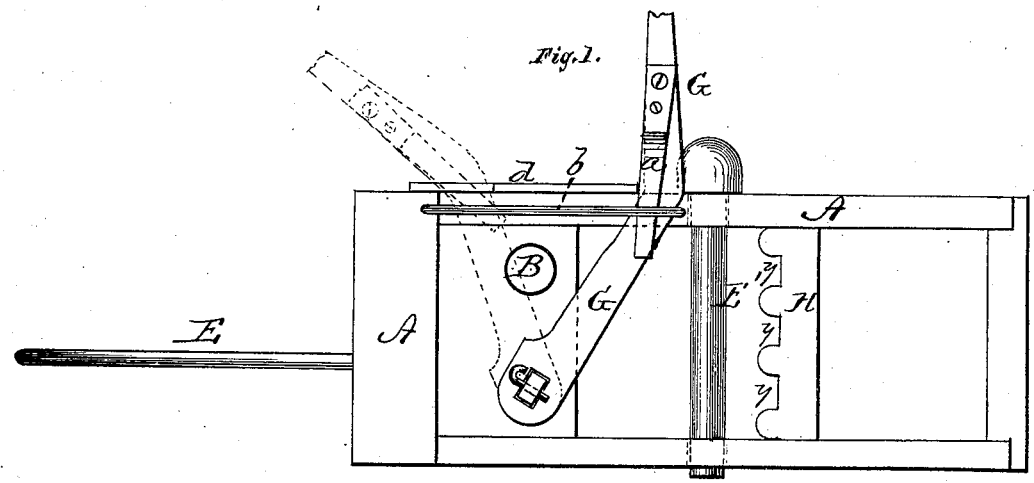
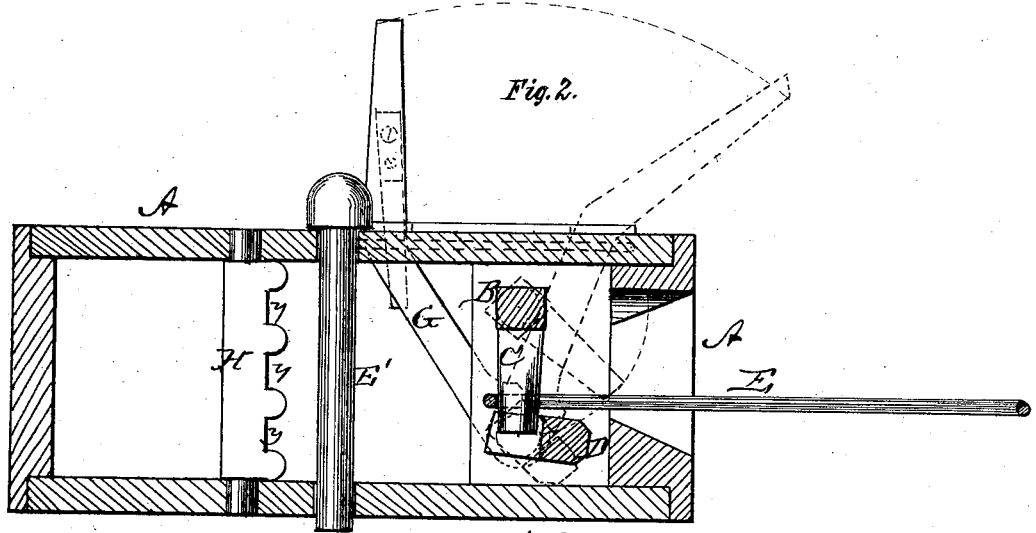
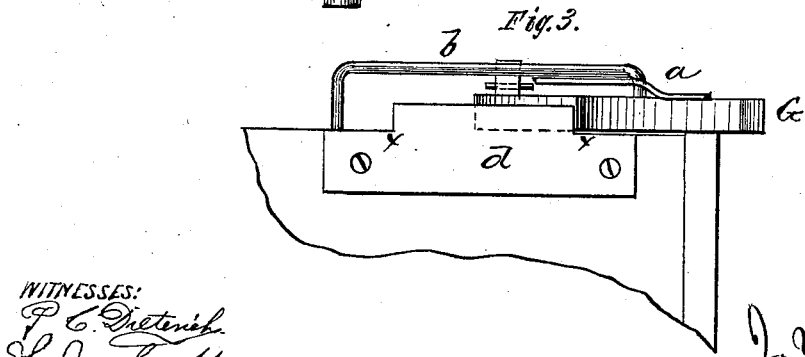
WITNESSES:
INVENTOR
J. Wilson Hess
per C. H. Watson & Co.
ATTORNEYS.

UNITED STATES PATENT OFFICE.

J. WILSON HESS, OF MONTANDON, PENNSYLVANIA, ASSIGNOR TO HIMSELF AND JOHN B. GREEN, OF SAME PLACE.

IMPROVEMENT IN CAR-COUPLINGS.

Specification forming part of Letters Patent No. 145,652, dated December 16, 1873; application filed November 5, 1873.

*To all whom it may concern:*

Be it known that I, J. WILSON HESS, of Montandon, in the county of Northumberland and State of Pennsylvania, have invented certain new and useful Improvements in Car-Coupling; and I do hereby declare that the following is a full, clear, and exact description thereof, reference being had to the accompanying drawings and to the letters of reference marked thereon, which form a part of this specification.

My invention relates to that class of car-couplings in which the ordinary draw-head is used with a rocking shaft arranged in the top near the mouth and provided with a downward-projecting arm to enter the coupling-link; and the nature of my invention consists in a rocking bar arranged in the bottom near the mouth to form a stop for the coupling-arm, and, when turned, allow said arm to swing back and forth; and in the construction and combination of parts—all of which will be hereinafter more fully set forth.

In order to enable others skilled in the art to which my invention appertains to make and use the same, I will now proceed to describe its construction and operation, referring to the annexed drawing, in which—

Figure 1 is a side elevation, and Fig. 2 a longitudinal vertical section, of an ordinary draw-head and car-coupling embodying my invention. Fig. 3 is a plan view of a part of the same.

A represents an ordinary draw-head, provided at the top near the mouth with a rocking shaft or bar, B, having a central downward-projecting arm, C, to enter the coupling-link E, when inserted in the draw-head to couple the cars. In the bottom of the draw-head A, near the mouth, is placed transversely a shaft or bar, D, which is cut out in the center and hung in such a manner that when turned in the position shown in Fig. 2 the bar will form a stop for the swinging arm C, so that, when the link has been inserted and the arm dropped into the same, the link cannot be withdrawn.

By turning the bar D in the position shown by the dotted lines in said Fig. 2, the arm C can swing both back and forth, thus allowing the link to be withdrawn and uncouple the cars. One of the journals of the bar D extends beyond the draw-head and has a lever, G, attached to its end, by means of which the bar is turned. This lever is provided with a spring, *a*, to bear against a railing, *b*, and force the lever into notches *x x* on a plate, *d*, attached to the top of the draw-head to hold the bar D securely in either of its two positions.

In the center of the rear part of the draw-head is a vertical bar, H, provided with a series of horizontal notches or recesses, *y y*, in its front side.

By placing the inner end of the coupling-link E in either of these notches it will be held in a certain position so as to enter the opposite draw-head. By means of this bar the link may be placed at any required angle to enter the other draw-head, whether the same is high or low.

The draw-head A may be provided with the ordinary coupling-pin E′, if so desired.

My coupling may be arranged in the ordinary draw-heads now generally in use.

Having thus fully described my invention, what I claim as new, and desire to secure by Letters Patent, is—

1. The combination, with the draw-head A and swinging coupling-arm C, of the rocking bar D, lever G, spring *a*, railing *b*, and notched plate *d*, all substantially as and for the purposes set forth.

2. The draw-head A, bar D cut out in the center, and the swinging arm C, all constructd and combined for operation, as and for the purpose set forth.

In testimony that I claim the foregoing as my own I affix my signature in presence of two witnesses.

J. WILSON HESS.

Witnesses:
HARRY C. SCOTT,
P. C. DIETERICH.